(12) United States Patent
Sacker et al.

(10) Patent No.: US 6,502,156 B1
(45) Date of Patent: Dec. 31, 2002

(54) CONTROLLING I/O DEVICES INDEPENDENTLY OF A HOST PROCESSOR

(75) Inventors: Stephen M. Sacker, Tempe, AZ (US); James D. Warren, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,502

(22) Filed: Dec. 27, 1999

(51) Int. Cl.[7] ........................ G06F 13/00; G06F 13/10
(52) U.S. Cl. .......................... 710/305; 713/100
(58) Field of Search ................ 710/104, 307, 710/305, 311, 100, 260, 301, 313, 1, 48; 713/100; 714/7; 370/402

(56) References Cited

U.S. PATENT DOCUMENTS

| | | | |
|---|---|---|---|
| 4,509,113 A | * | 4/1985 | Heath |
| 5,911,055 A | | 6/1999 | Whiteman et al. .......... 395/309 |
| 6,070,207 A | * | 5/2000 | Bell |
| 6,085,333 A | * | 7/2000 | DeKoning et al. |
| 6,148,356 A | * | 11/2000 | Archer et al. |

* cited by examiner

Primary Examiner—Gopal C. Ray
(74) Attorney, Agent, or Firm—Trop, Pruner & Hu, P.C.

(57) ABSTRACT

An input/output device on a bus may be controlled to enable advanced features such as RAID to be implemented on a system board which is not otherwise specially adapted in any fashion to implement such features. The system board need not include, in its basic configuration, a host bus adapter such as one using an I/O processor, or standard BIOS instructions which assist in the implementation of the advanced features. The advanced features may be implemented by plugging an appropriate host bus adapter into an appropriate bus slot to provide the advanced functionality. By using special logic and signals on the host bus adapter, the advanced functionality may be achieved in a platform independent system board implementation and without the added cost of an I/O device on the host bus adapter.

30 Claims, 3 Drawing Sheets

CONTROLLING I/O DEVICES INDEPENDENTLY OF A HOST PROCESSOR

BACKGROUND

This invention relates generally to processor-based systems and particularly to the control of input/output (I/O) devices coupled to a bus in processor-based systems.

A host bus adapter (HBA) is a device for connecting input/output peripherals to a processor-based system. Host bus adapters may be utilized, for example, for implementing a small computer system interface (SCSI) high speed parallel interface defined by the X3T9.2 Committee of the American National Standards Institute (ANSI). A SCSI interface may connect processor-based systems to SCSI peripheral devices such as hard disk drives, printers, and other devices. A plurality of SCSI devices may be coupled by a SCSI bus. A SCSI bus is a parallel bus that carries data and control signals from the SCSI host bus adapter to the SCSI devices. A SCSI device is a peripheral device that uses the SCSI standard to exchange data and control signals with a processor.

One system of peripheral devices for storing data is called a redundant array of independent disks (RAID). RAID is a data storage method in which data, along with information used for error correction, such as parity bits or Hamming codes, is distributed among two or more hard disk drives in order to improve performance and/or data integrity. A hard disk array may be governed by array management software and a host bus adapter which handles the error correction.

A zero channel RAID (ZCR) adapter is a RAID adapter that uses the system's I/O device to transfer data to the system's storage devices. Generally these adapters are intelligent boards using some form of input/output (I/O) processor. An I/O processor is a processor that handles input/output operations so as to reduce the burden on the host processor. A host processor is a microprocessor which controls the processor-based system and is generally coupled to system memory and chipset.

In one standard motherboard mounted I/O device, interrupts for the I/O device are routed to the system interrupt controller. Implementing hardware-based RAID functionality using such an I/O device is difficult because there is no way of intercepting the I/O data from host memory, performing the RAID function and then forwarding the data to the I/O channel without control of the I/O device's interrupt signals. The system I/O device's Initialization Device Select (IDSEL) signal may also be uncontrolled. When the system boots after a reset, the host basic input/output system (BIOS) initiates a bus scan to find all the bus components installed in the system. The system uses the IDSEL signal to identify an I/O device and then assign the necessary resources. Without independent control of the I/O devices IDSEL and interrupt signals, the host and the ZCR adapter may both attempt to configure the same I/O device. Contention is likely to result during system Power On Self Test (POST) and operating system plug and play operation.

Because processor-based systems use different chipsets and are designed by different design engineers, each platform may control the IDSEL and interrupt signals differently. To accommodate the variations from one platform to another, the host BIOS may also require changes to implement each new functionality. This variation in implementation interferes with developing an industry standard implementation and increases the design burden on platform designers.

Thus there is a need for a platform independent way to allow the control of I/O devices using ZCR adapters.

SUMMARY

In accordance with one aspect, a method includes coupling a host bus adapter on a first bus coupled to a host processor. A host processor configuration cycle is held off using the host bus adapter. An input/output device on the first bus is controlled independently of the host processor.

Other aspects are set forth in the accompanying detailed description and claims.

DETAILED DESCRIPTION

Figure 1:
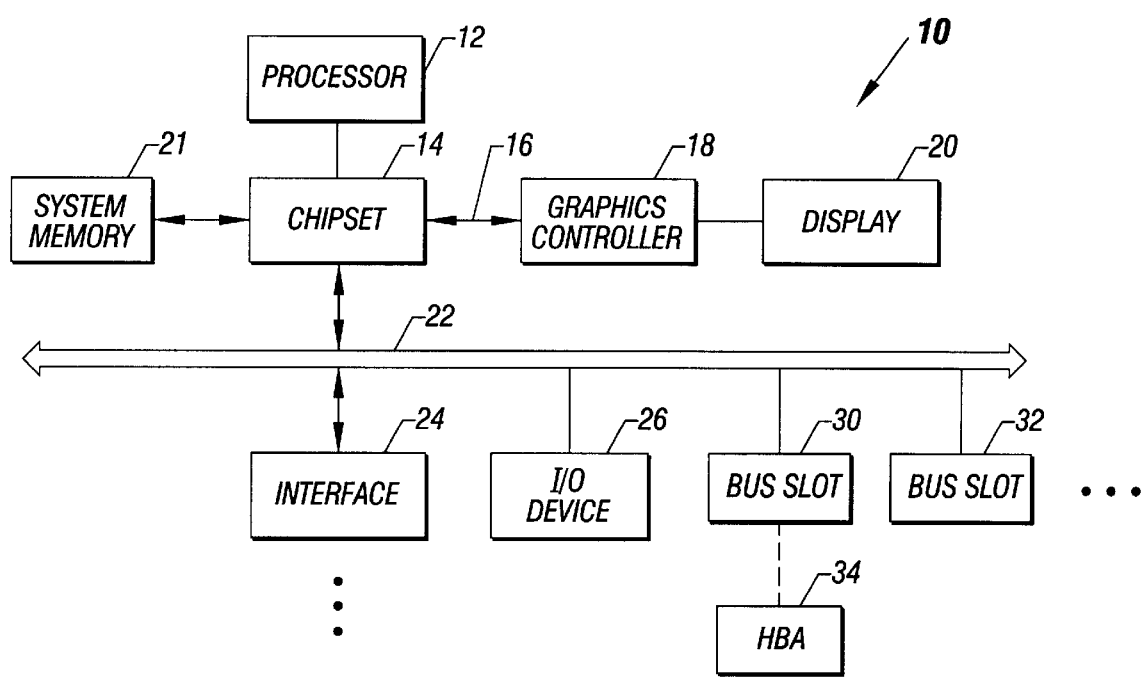
FIG. 1 is a block depiction of a processor-based system in accordance with one embodiment of the present invention.

Referring to FIG. 1, a processor-based system 10 may include a host processor 12 coupled to chipset 14. The chipset 14 may be a bridge or interface, as examples. The chipset 14 may be coupled to a graphics controller 18. The controller 18 may control a display 20. The chipset 14 may also be coupled to the host system memory 21.

The chipset 14 may be coupled to a bus 22. In one embodiment of the present invention, the bus 22 is a Peripheral Component Interconnect (PCI) bus which is compliant with the PCI Local Bus Specification, Revision 2.2, Jun. 8, 1998 available from the PCI Special Interest Group, Portland, Oreg. 97214.

The bus 22 may be coupled to an interface 24 which may also be part of a chipset or which may be implemented by a bridge as examples. A legacy bus (not shown) may be coupled to the interface 24. Also coupled to the bus 22 is an I/O device 26 which may be a host bus adapter in one embodiment of the invention. The I/O device 26 may be, for example, a SCSI, Fibre Channel (ANSI Standard X.3230-1994-Fibre Channel Physical and Signaling Standard (FC-PH) available at www.fibrechannel.com/technology/techframe.htm), Ethernet (see, e.g., IEEE Standard 802.3 available at standards.ieee.org), or Infiniband™ Trade Association (www.infinibandta.com) compliant I/O device.

A host bus adapter (HBA) 34 may be coupled to a PCI expansion slot 30 which may be a modified PCI expansion slot. However, these slot modifications need not affect the PCI functionality. A plurality of additional PCI expansion slots 32 may also be available. An I/O processor (IOP) 38 may be included on the adapter 34.

In one embodiment of the present invention, an on-board SCSI device acting as the I/O device 26 may be enhanced using an HBA 34 to perform RAID functions. Similarly an on-board Ethernet I/O device may be enhanced to run accelerated Transmission Control Protocol/Internet Protocol (TCP/IP) (Request for Comments 791 and 793 (www.ietf.org/rfc.html)). Thus, users may have an available upgrade path that is at a lower cost than purchasing an adapter that has a similar I/O device already located on the host bus adapter.

Figure 2:
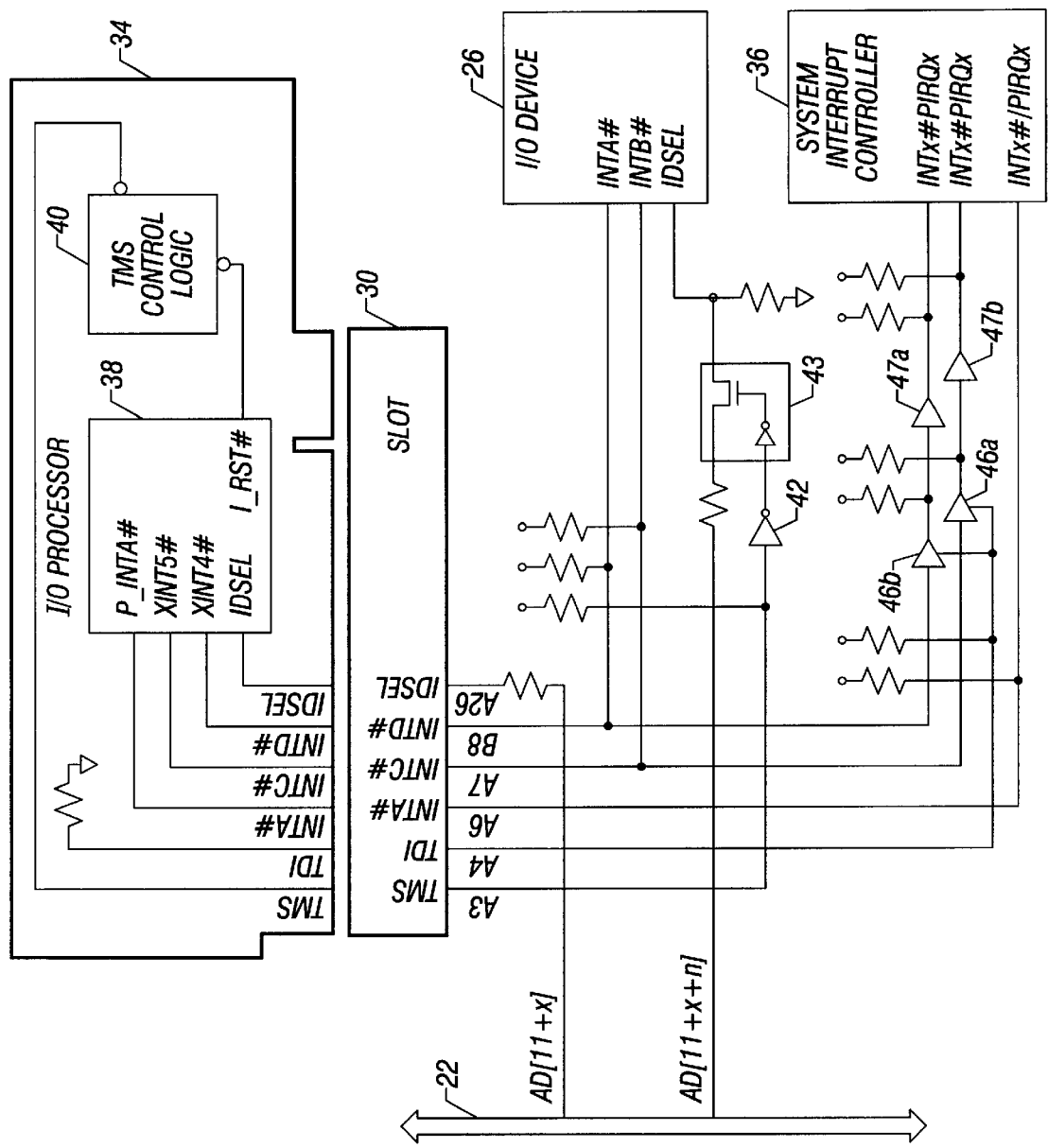
FIG. 2 is a more detailed block depiction of one embodiment of the present invention.

Referring next to FIG. 2, the I/O device 26 interrupt signals (e.g. INTA#, INTB#) are routed to the slot 30 when the adapter 34 is in the slot 30. The tristate buffers 46a or 46b are used to disable the I/O device 26 interrupts to the system interrupt controller 36. When the adapter 34 is present in the slot 30, the I/O device 26 interrupts are steered to slot 30. When a host bus adapter 34 is not in the slot 30, then the I/O device 26 interrupts are steered to the system interrupt controller 36. The PCI slot JTAG (IEEE Standard 1149.1 Test Access Port and Boundary Scan Architecture) pin, Test Data Input (TDI), provides a control signal to control the buffers 46. The buffers 46 are in the path of the routed interrupt signals from the I/O device 26 to the system interrupt controller 36.

When the adapter 34 is present in the slot 30, the PCI signal TDI is driven low and the buffers 46a and 46b are turned off. The interrupts remain connected to the slot 30. During system operation, the I/O device 26 interrupts are controlled by the I/O processor (IOP) 38 on the adapter 34. Any interrupt from the I/O device 26 may then be serviced by the firmware running on the IOP 38. The IOP 38 may be one of the i960®Rx I/O Processors available from Intel Corporation, Santa Clara, Calif.

When either the HBA 34 is absent from the slot 30 or an HBA that does not control the interrupt and configuration signals is used to slot 30, the buffers 46 are enabled. In such case, the interrupts from the I/O device 26 are handled by the system interrupt controller 36.

The IDSEL signal is used as a chip select signal during configuration cycles initiated by the host processor 12 basic input/output system (BIOS), operating system or HBA 34. When the HBA 34 is present in the slot 30, a JTAG signal, Test Mode Select (TMS), is driven low, turning off the switch 43, thereby hiding the I/O device 26 from the system 10. When the host processor initiated configuration cycle for the IOP 38 occurs, the IOP 38 is able to hold off the host processor 12 by retrying the configuration cycle. This enables the IOP 38 to perform its own configuration cycles on the bus 22. When the HBA 34 intends to perform configuration cycles on the PCI bus segment of the I/O device 26, TMS is asserted high. In that case, the IDSEL pin on the I/O device 26 may be addressed by the IOP 38 over the bus 22. The TMS signal is controlled by the logic 40 on the HBA 34 under control by the IOP 38.

This operation allows only the HBA 34 to control the device 26 and to set up the necessary resources in host memory 21. Since IDSEL is a synchronous signal with respect to the PCI clock, the switch 43 is advantageously a subnanosecond propagation delay device. For example, a quick bus switch may be used as the switch 43 to enable and disable the IDSEL signal to the I/O device 26.

Once the HBA 34 is present in the slot 30, configuration responsibility for the I/O device 26 falls to the HBA 34. Firmware running on the HBA 34 controls the state of the signal TMS after reset. The firmware is also responsible for properly identifying and resourcing the I/O device 26 on the host system 10. When the IOP 38 on the HBA 34 receives a host initiated configuration cycle, it holds off the host processor 12, for example, by issuing retries until it has completed its own initialization.

The firmware on the HBA 34 initiates a primary PCI bus scan of its own. One method by which the firmware can identify the I/O device 26 it needs to control is by completing a bus scan with TMS toggled low (i.e., the I/O device's IDSEL signal is hidden from the host system 10), and then comparing it to a bus scan with TMS high (i.e., the I/O device's IDSEL is available to the host system 10). Once the I/O device 26 is identified, the firmware may then properly resource the targeted system I/O device 26.

Upon completion of firmware controlled bus scans, TMS is again toggled low, hiding the I/O device 26 from the host processor 12. The firmware then stops retrying the host initiated configuration cycle and the system continues its normal boot process. The HBA 34 advantageously does not interfere with the system (non-I/O device 26) configuration cycles.

As a result, the host BIOS does not require modifications to accommodate advanced features. Responsibility for the I/O device 26 configuration and resourcing falls to the HBA 34 firmware.

This embodiment of the present invention achieves a low cost standardized way to implement advanced features such as RAID on systems that already have on-board I/O devices. Thus, for a relatively low cost, a system designer can add advanced capabilities such as RAID capabilities to system designs for those systems which need the advanced features. The host system 10 may use the I/O device 26 without the HBA 34 installed.

Figure 3:
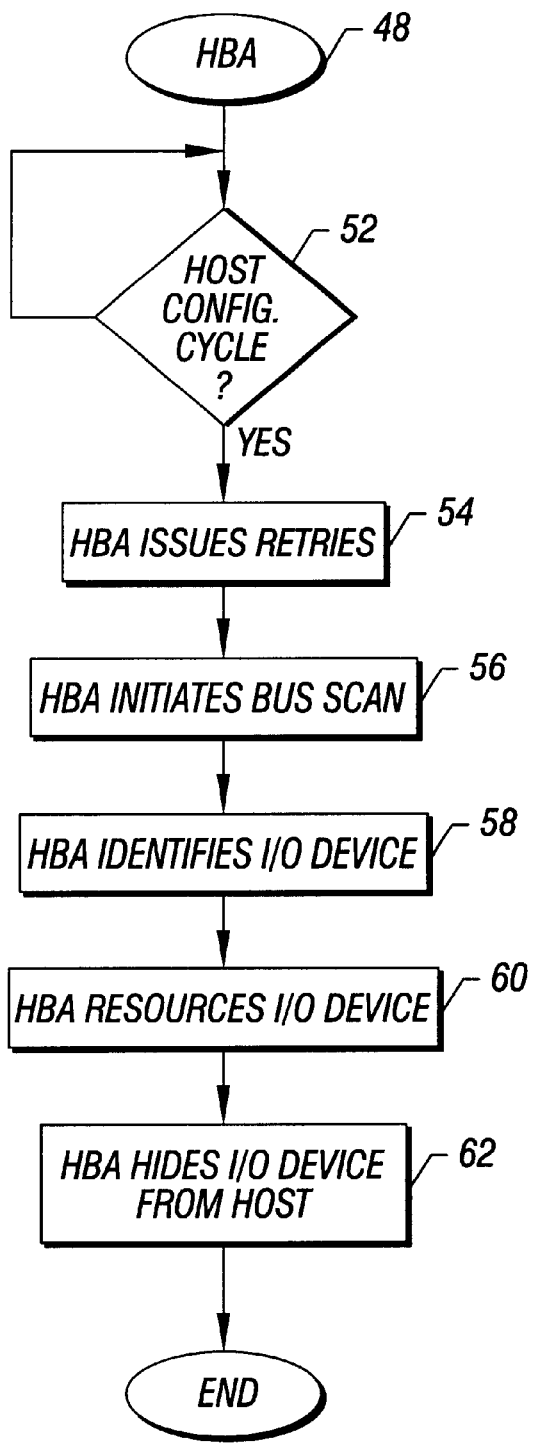
FIG. 3 is a flow diagram for software for implementing one embodiment of the present invention.

Referring to FIG. 3, the firmware 48, which may be stored in association with the HBA 34, may begin by determining whether a host configuration cycle has been implemented as indicated in diamond 52. If so, retries are issued by the HBA 34 to hold off the host processor 12, as indicated in block 54.

Thereafter, the HBA 34 may initiate its own bus scan of devices coupled to the bus 22 (block 56). The I/O device 26 is identified as indicated in block 58 and described previously. The I/O device 26 is then resourced as indicated in block 60 and the I/O device 26 is hidden from the host processor 12 as suggested in block 62.

The firmware 48 controls the I/O device 26 independently of the host processor 12, the host operating system and the host BIOS. As a result, advanced functions may be added to systems in a platform independent fashion.

While an embodiment using SCSI and RAID is described, the present invention may implement other intelligent functions. For example, a hostless back-up system may be implemented.

While the present invention has been described with respect to a limited number of embodiments, those skilled in the art will appreciate numerous modifications and variations therefrom. It is intended that the appended claims cover all such modifications and variations that fall within the true spirit and scope of this appended invention.

What is claimed is:

1. A method comprising:
   coupling a host bus adapter on a first bus coupled to a host processor;
   holding off said host processor configuration cycle using said host bus adapter; and
   controlling an input/output device on said first bus independently of said host processor.

2. The method of claim 1 wherein controlling includes using an input/output processor on said host bus adapter to control said input/output device.

3. The method of claim 1 wherein holding off a configuration cycle of said host processor includes retrying a configuration cycle on a peripheral component interconnect bus.

4. The method of claim 1 wherein coupling a host bus adapter includes mounting a host bus adapter into a bus slot on said first bus, disabling interrupts of said input/output device on the first bus from a system interrupt controller, and routing said interrupts to said bus slot.

5. The method of claim 1 wherein coupling a host bus adapter includes mounting said host bus adapter in a bus slot on said first bus and disabling the initialization device select signal of said input/output device on the first bus.

6. The method of claim 1 further including holding off the host processor while initiating configuration cycles from said host bus adapter on said first bus.

7. The method of claim 6 including initiating a first bus scan using said adapter.

8. The method of claim 7 including identifying said input/output device on said first bus.

9. The method of claim 8 including resourcing said input/output device on said first bus.

10. The method of claim 1 further including hiding said input/output device from said host processor.

11. The method of claim 1 further including acknowledging interrupt signals from said input/output device and processing said interrupt signals on said adapter.

12. An article comprising a medium for storing instructions that cause a controller to:

hold off host processor initiated configuration cycles on a first bus; and control an input/output device on said first bus independently of said host processor.

13. The article of claim 12 further storing instructions that cause a controller to cause said input/output device on said first bus to ignore host processor initiated configuration cycles.

14. The article of claim 13 further storing instructions that cause a controller to enable and disable the initialization device select signal of said input/output device on a bus.

15. The article of claim 12 further storing instructions that cause a controller to generate signals that cause said host bus adapter to generate a signal through a slot on said first bus to operate buffers to disable said input/output device interrupts to a host processor-based system.

16. The article of claim 12 further storing instructions that cause a controller to hold the host processor off while generating its own configuration cycles.

17. The article of claim 16 further storing instructions that cause a controller to initiate a bus scan.

18. The article of claim 17 further storing instructions that cause a controller to identify said input/output device on said first bus.

19. The article of claim 18 further storing instructions that cause a controller to resource said input/output device on said first bus.

20. The article of claim 12 further storing instructions that cause a controller to hide said input/output device from said host processor.

21. The article of claim 12 further storing instructions that cause a controller to acknowledge interrupt signals from said input/output device and process said interrupt signals.

22. A host bus adapter comprising:

a connector to connect said host bus adapter to a slot on a host processor-based system bus;

a controller coupled to said connector; and control logic coupled to said controller to control configuration cycles to an input/output device on said bus, said controller operative to control said input/output device independently of a host processor also coupled to said bus.

23. The host bus adapter of claim 22 wherein said control logic controls a switch on said bus to control an initialization device select signal of said input/output device on said bus.

24. The host bus adapter of claim 22 wherein said controller processes interrupt signals issued by said input/output device received through said connector.

25. The host bus adapter of claim 22 wherein said controller implements an input/output processor.

26. The host bus adapter of claim 25 wherein said controller uses a bus signal to control whether the controller receives interrupts from said input/output device.

27. The host bus adapter of claim 22 wherein said controller uses a bus signal to control whether or not configuration cycles for said input/output device are routed to said input/output device.

28. The host bus adapter of claim 22 wherein said host bus adapter implements redundant array of independent disks.

29. A processor-based system comprising:

a host processor;

a bus coupled to said processor;

a host bus adapter coupled to said bus; and control logic coupled to said host bus adapter to control configuration cycles to an input/output device on said bus, said host bus adapter operative to control said input/output device independently of said host processor.

30. The system of claim 29 wherein said host bus adapter includes an input/output processor.

* * * * *